US009654553B2

(12) United States Patent
Mann (10) Patent No.: US 9,654,553 B2
(45) Date of Patent: May 16, 2017

(54) ROUTING TO MULTIPLE DIAMETER PEERS WITH THE SAME IDENTITY

(71) Applicant: ALCATEL-LUCENT CANADA INC., Ottawa (CA)

(72) Inventor: Robert A. Mann, Carp (CA)

(73) Assignee: Alcatel Lucent, Boulogne-Billiancourt (FR)

( * ) Notice: Subject to any disclaimer, the term of this patent is extended or adjusted under 35 U.S.C. 154(b) by 141 days.

(21) Appl. No.: 14/542,033

(22) Filed: Nov. 14, 2014

(65) Prior Publication Data

US 2016/0142368 A1    May 19, 2016

(51) Int. Cl.
G06F 15/16 (2006.01)
H04L 29/08 (2006.01)
H04L 12/24 (2006.01)
H04L 29/12 (2006.01)

(52) U.S. Cl.
CPC ...... H04L 67/1078 (2013.01); H04L 41/0893 (2013.01); H04L 61/103 (2013.01); H04L 61/203 (2013.01)

(58) Field of Classification Search
None
See application file for complete search history.

(56) References Cited

U.S. PATENT DOCUMENTS

| 5,331,634 | A  | * | 7/1994  | Fischer   | H04L 12/4604 370/405  |
| 8,554,928 | B2 | * | 10/2013 | Craig     | H04L 63/0892 709/228  |
| 2010/0195613 | A1 | * | 8/2010  | Hu        | H04L 29/12896 370/329 |
| 2015/0149656 | A1 | * | 5/2015  | McMurry   | H04L 45/00 709/238    |

OTHER PUBLICATIONS

Oracle @ COmmunication Service Broker "Signaling Server Units Configuration Guide" Release 6.1—E29457—Feb. 1, 2013.*
Oracle et al. Oracle Communication Broker—Signlaing Server units configuration guide—Release 6.1—Publication Date: Feb. 2013.*

* cited by examiner

Primary Examiner — Joshua Joo
Assistant Examiner — Younes Naji
(74) Attorney, Agent, or Firm — Kramer & Amado, P.C.

(57) ABSTRACT

Various exemplary embodiments relate to a method performed by a Diameter Routing Agent (DRA) for processing a Diameter message, the method including: providing alias Diameter identifiers (IDs) to peers with the same Diameter IDs; receiving a Diameter message at the DRA associated with one of the peers with the same Diameter ID; determining a correct peer of the peers with the same Diameter ID associated with the received Diameter message; setting the destination host of the received Diameter message to the aliased ID of the correct peer; and transmitting the Diameter message to the correct peer.

10 Claims, 4 Drawing Sheets

FIG. 6

ROUTING TO MULTIPLE DIAMETER PEERS WITH THE SAME IDENTITY

TECHNICAL FIELD

Various exemplary embodiments disclosed herein relate generally to computer networking.

BACKGROUND

Since its proposal in Internet Engineering Task Force (IETF) Request for Comments (RFC) 3588, the Diameter protocol has been increasingly adopted by numerous networked applications. For example, the Third Generation Partnership Project (3GPP) has adopted Diameter for various policy and charging control (PCC), mobility management, and IP multimedia subsystem (IMS) applications. As IP-based networks replace circuit-switched networks, Diameter is even replacing SS7 as the key communications signaling protocol. As networks evolve, Diameter is becoming a widely used protocol among wireless and wireline communications networks.

One significant aspect of the Diameter protocol is Diameter packet routing. Entities referred to as Diameter routing agents (DRAs) facilitate movement of packets in a network. In various deployments, DRAs may perform elementary functions such as simple routing, proxying, and redirect.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a Diameter Routing Agent (DRA) for processing a Diameter message, the method including: providing alias Diameter identifiers (IDs) to peers with the same Diameter IDs; receiving a Diameter message at the DRA associated with one of the peers with the same Diameter ID; determining a correct peer of the peers with the same Diameter ID associated with the received Diameter message; setting the destination host of the received Diameter message to the aliased ID of the correct peer; and transmitting the Diameter message to the correct peer.

Various exemplary embodiments relate to a method performed by a Diameter Routing Agent (DRA) for processing a Diameter message, the method including: providing alias Diameter identifiers (IDs) to peers with the same Diameter IDs; creating routes for each of the peers with the same Diameter IDs using aliased realms; receiving a Diameter message at the DRA associated with one of the peers with the same Diameter ID; determining a correct peer of the peers with the same Diameter ID associated with the received Diameter message; setting the destination host of the received Diameter message to the actual Diameter ID of the correct peer; setting the destination realm of the received Diameter message to the aliased realm associated with the correct peer; and transmitting the Diameter message to the correct peer.

Various exemplary embodiments relate to a non-transitory machine-readable storage medium encoded with instructions for execution by a Diameter Routing Agent (DRA) for processing a Diameter message, the medium including: instructions for providing alias Diameter identifiers (IDs) to peers with the same Diameter IDs; instructions for receiving a Diameter message at the DRA associated with one of the peers with the same Diameter ID; instructions for determining a correct peer of the peers with the same Diameter ID associated with the received Diameter message; instructions for setting the destination host of the received Diameter message to the aliased ID of the correct peer; and instructions for transmitting the Diameter message to the correct peer.

Various exemplary embodiments relate to a non-transitory machine-readable storage medium encoded with instructions for execution by a Diameter Routing Agent (DRA) for processing a Diameter message, the medium including: instructions for providing alias Diameter identifiers (IDs) to peers with the same Diameter IDs; instructions for creating routes for each of the peers with the same Diameter IDs using aliased realms; instructions for receiving a Diameter message at the DRA associated with one of the peers with the same Diameter ID; instructions for determining a correct peer of the peers with the same Diameter ID associated with the received Diameter message; instructions for setting the destination host of the received Diameter message to the actual Diameter ID of the correct peer; instructions for setting the destination realm of the received Diameter message to the aliased realm associated with the correct peer; and instructions for transmitting the Diameter message to the correct peer.

Various exemplary embodiments relate to a method performed by a Diameter Routing Agent (DRA) or processing a Diameter message, the method including: determining that more than one peer of the DRA have the same Diameter identifiers (IDs); receiving a Diameter message at the DRA associated with one of the peers with the same Diameter ID; determining a correct peer of the peers with the same Diameter ID associated with the received Diameter message and it assigned IP address; instructing a Diameter stack to transmit the Diameter message to the peer based upon the IP address.

Various exemplary embodiments relate to a non-transitory machine-readable storage medium encoded with instructions for execution by a Diameter Routing Agent (DRA) for processing a Diameter message, the medium including: instructions for determining that more than one peer of the DRA have the same Diameter identifiers (IDs); instructions for receiving a Diameter message at the DRA associated with one of the peers with the same Diameter ID; instructions for determining a correct peer of the peers with the same Diameter ID associated with the received Diameter message and it assigned IP address; instructions for instructing a Diameter stack to transmit the Diameter message to the peer based upon the IP address.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure or substantially the same or similar function.

DETAILED DESCRIPTION

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. As used herein, the terms "context" and "context object" will be understood to be synonymous, unless otherwise indicated.

Diameter Routing Agents (DRAs) available today provide only basic functionalities typically defined in hard coding or scripting. As such, users may typically not be empowered to easily and flexibly define more complex behaviors for a DRA.

Figure 1:
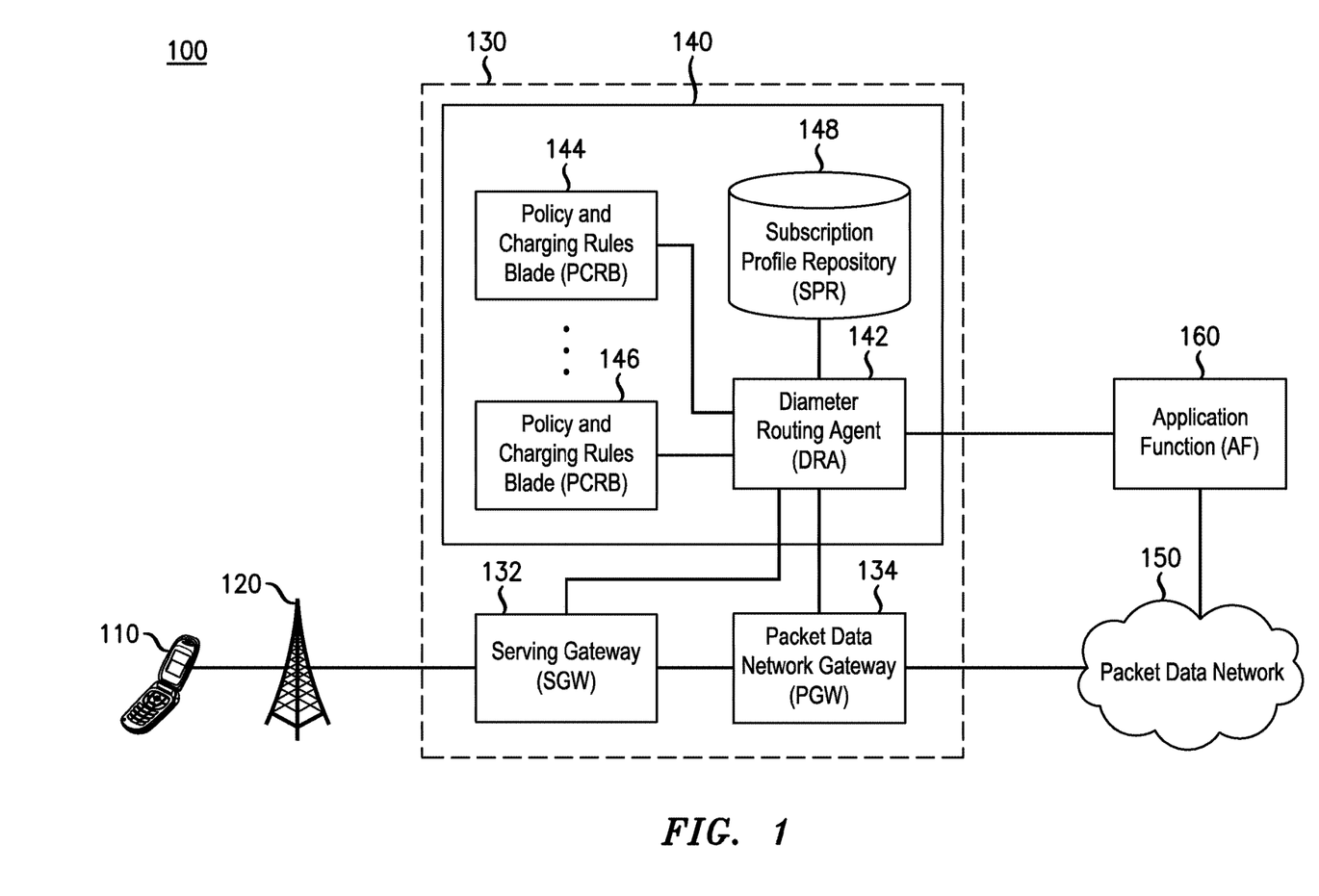
FIG. 1 illustrates an exemplary network environment for a Diameter Routing Agent.

FIG. 1 illustrates an exemplary network environment 100 for a Diameter Routing Agent (DRA) 142. Exemplary network environment 100 may be a subscriber network for providing various services. In various embodiments, subscriber network 100 may be a public land mobile network (PLMN). Exemplary subscriber network 100 may be telecommunications network or other network for providing access to various services. Exemplary subscriber network 100 may include user equipment 110, base station 120, evolved packet core (EPC) 130, packet data network 150, and application function (AF) 160.

User equipment 110 may be a device that communicates with packet data network 150 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, tablet, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by the relevant 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the relevant 3GPP standards. EPC 130 may include a serving gateway (SGW) 132, a packet data network gateway (PGW) 134, and a session control device 140.

Serving gateway (SGW) 132 may be a device that provides gateway access to the EPC 130. SGW 132 may be one of the first devices within the EPC 130 that receives packets sent by user equipment 110. Various embodiments may also include a mobility management entity (MME) (not shown) that receives packets prior to SGW 132. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services.

Session control device 140 may be a device that provides various management or other functions within the EPC 130. For example, session control device 140 may provide a Policy and Charging Rules Function (PCRF). In various embodiments, session control device 140 may include an Alcatel Lucent 5780 Dynamic Services Controller (DSC). Session control device 140 may include a DRA 142, a plurality of policy and charging rules blades (PCRBs) 144, 146, and a subscriber profile repository.

As will be described in greater detail below, DRA 142 may be an intelligent Diameter Routing Agent. As such, DRA 142 may receive, process, and transmit various Diameter messages. DRA 142 may include a number of user-defined rules that govern the behavior of DRA 142 with regard to the various Diameter messages DRA 142 may encounter. Based on such rules, the DRA 142 may operate as a relay agent, proxy agent, or redirect agent. For example, DRA 142 may relay received messages to an appropriate recipient device. Such routing may be performed with respect to incoming and outgoing messages, as well as messages that are internal to the session control device.

Policy and charging rules blades (PCRB) 144, 146 may each be a device or group of devices that receives requests for application services, generates PCC rules, and provides PCC rules to the PGW 134 or other PCENs (not shown). PCRBs 144, 146 may be in communication with AF 160 via an Rx interface. As described in further detail below with respect to AF 160, PCRB 144, 146 may receive an application request in the form of an Authentication and Authorization Request (AAR) from AF 160. Upon receipt of an AAR, PCRB 144, 146 may generate at least one new PCC rule for fulfilling the application request.

PCRB 144, 146 may also be in communication with SGW 132 and PGW 134 via a Gxx and a Gx interface, respectively. PCRB 144, 146 may receive an application request in the form of a credit control request (CCR) from SGW 132 or PGW 134. As with an AAR, upon receipt of a CCR, PCRB 144, 146 may generate at least one new PCC rule for fulfilling the application request. In various embodiments, the AAR and the CCR may represent two independent application requests to be processed separately, while in other embodiments, the AAR and the CCR may carry information regarding a single application request and PCRB 144, 146 may create at least one PCC rule based on the combination of the AAR and the CCR. In various embodiments, PCRB 144, 146 may be capable of handling both single-message and paired-message application requests.

Upon creating a new PCC rule or upon request by the PGW 134, PCRB 144, 146 may provide a PCC rule to PGW 134 via the Gx interface. In various embodiments, such as those implementing the proxy mobile IP (PMIP) standard for example, PCRB 144, 146 may also generate QoS rules. Upon creating a new QoS rule or upon request by the SGW 132, PCRB 144, 146 may provide a QoS rule to SGW 132 via the Gxx interface.

Subscriber profile repository (SPR) 148 may be a device that stores information related to subscribers to the subscriber network 100. Thus, SPR 148 may include a machine-readable storage medium such as read-only memory (ROM), random-access memory (RAM), magnetic disk storage media, optical storage media, flash-memory devices, and/or similar storage media. SPR 148 may be a component of one of PCRB 144, 146 or may constitute an independent node within EPC 130 or session control device 140. Data stored by SPR 138 may include subscriber information such as identifiers for each subscriber, bandwidth limits, charging parameters, and subscriber priority.

Packet data network 150 may be any network for providing data communications between user equipment 110 and other devices connected to packet data network 150, such as AF 160. Packet data network 150 may further provide, for example, phone or Internet service to various user devices in communication with packet data network 150.

Application function (AF) 160 may be a device that provides a known application service to user equipment 110. Thus, AF 160 may be a server or other device that provides, for example, a video streaming or voice communication service to user equipment 110. AF 160 may further be in communication with the PCRB 144, 146 of the EPC 130 via an Rx interface. When AF 160 is to begin providing known application service to user equipment 110, AF 160 may generate an application request message, such as an authentication and authorization request (AAR) according to the Diameter protocol, to notify the PCRB 144, 146 that resources should be allocated for the application service. This application request message may include information such as an identification of the subscriber using the application service, an IP address of the subscriber, an APN for an associated IP-CAN session, or an identification of the particular service data flows that must be established in order to provide the requested service.

As will be understood, various Diameter applications may be established within subscriber network 100 and supported by DRA 142. For example, an Rx application may be established between AF 160 and each of PCRBs 144, 146. As another example, an Sp application may be established between SPR 148 and each of PCRBs 144, 146. As yet another example, an S9 application may be established between one or more of PCRBs 144, 146 and a remote device implementing another PCRF (not shown). As will be understood, numerous other Diameter applications may be established within subscriber network 100.

In supporting the various potential Diameter applications, DRA 142 may receive Diameter messages, process the messages, and perform actions based on the processing. For example, DRA 142 may receive a Gx CCR from PGW 134, identify an appropriate PCRB 144, 146 to process the Gx CCR, and forward the Gx CCR to the identified PCRB 144, 146. DRA 142 may also act as a proxy by modifying the subsequent Gx CCA sent by the PCRB 144, 146 to carry an origin-host identification pointing to the DRA 142 instead of the PCRB 144, 146. Additionally or alternatively, DRA 142 may act as a redirect agent or otherwise respond directly to a request message by forming an appropriate answer message and transmitting the answer message to an appropriate requesting device.

Figure 2:
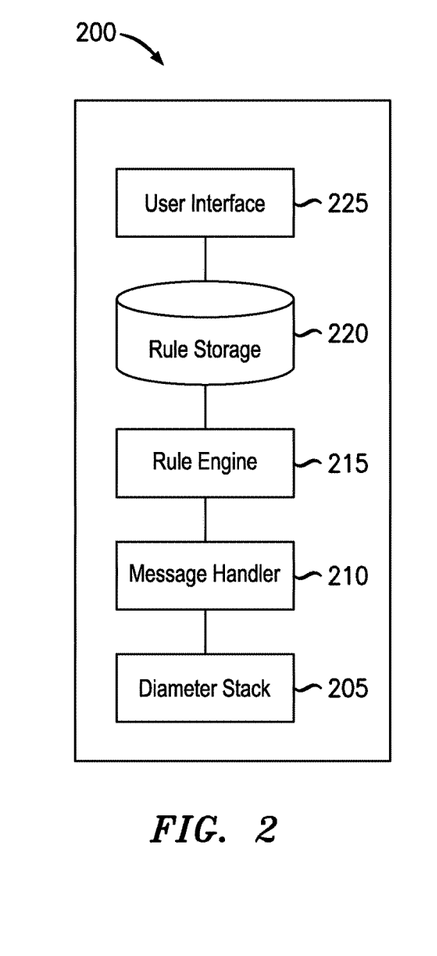
FIG. 2 illustrates an exemplary Diameter Routing Agent.

FIG. 2 illustrates an exemplary Diameter Routing Agent (DRA) 200. DRA 200 may be a standalone device or a component of another system. It may be implemented using a processor and memory with instructions for execution on the processor. Alternatively, it may include specific hardware for performing the various functions. For example, DRA 200 may correspond to DRA 142 of exemplary environment 100. In such an embodiment, DRA 142 may support various Diameter applications defined by the 3GPP such as Gx, Gxx, Rx, or Sp. It will be understood that DRA 200 may be deployed in various alternative embodiments wherein additional or alternative applications are supported. As such, it will be apparent that the methods and systems described herein may be generally applicable to supporting any Diameter applications.

DRA 200 may include a number of components such as Diameter stack 205, message handler 210, rule engine 215, rule storage 220, and user interface 225.

Diameter stack 205 may include hardware or executable instructions on a machine-readable storage medium configured to exchange messages with other devices according to the Diameter protocol. Diameter stack 205 may include an interface including hardware or executable instructions encoded on a machine-readable storage medium configured to communicate with other devices. For example, Diameter stack 205 may include an Ethernet or TCP/IP interface. In various embodiments, Diameter stack 205 may include multiple physical ports.

Diameter stack 205 may also be configured to read and construct messages according to the Diameter protocol. For example, Diameter stack may be configured to read and construct CCR, CCA, AAR, AAA, RAR, and RAA messages. Diameter stack 205 may provide an application programmer's interface (API) such that other components of DRA 200 may invoke functionality of Diameter stack. For example, rule engine 215 may be able to utilize the API to read an attribute-value pair (AVP) from a received CCR or to modify an AVP of a new CCA. Various additional functionalities will be apparent from on the following description.

Message handler 210 may include hardware or executable instructions on a machine-readable storage medium configured to interpret received messages and invoke rule engine 215 as appropriate. In various embodiments, message handler 210 may extract a message type from a message received by Diameter stack 205 and invoke the rule engine using a rule set that is appropriate for the extracted message type. For example, the message type may be defined by the application and command of the received message. After evaluating one or more rules, rule engine 215 may pass back an action to be taken or a message to be sent. Message handler 210 may then transmit one or more messages via Diameter stack 205, as indicated by the rule engine 215.

Rule engine 215 may include hardware or executable instructions on a machine-readable storage medium configured to process a received message by evaluating one or more rules stored in rule storage 220. As such, rule engine 215 may be a type of processing engine. Rule engine 215 may retrieve one or more rules, evaluate criteria of the rules to determine whether the rules are applicable, and specify one or more result of any applicable rules. For example, rule engine 215 may determine that a rule is applicable when a received Gx CCR includes a destination-host AVP identifying DRA 200. The rule may specify that the destination-host AVP should be changed to identify a PCRB before the message is forwarded.

Rule storage 220 may be any machine-readable medium capable of storing one or more rules for evaluation by rule engine 215. Accordingly, rule storage 220 may include a machine-readable storage medium such as read-only memory (ROM), random-access memory (RAM), magnetic disk storage media, optical storage media, flash-memory devices, and/or similar storage media. In various embodiments, rule storage 220 may store one or more rule sets as a binary decision tree data structure. Various other data structures for storing a rule set will be apparent.

It will be understood that, while various components are described as being configured to perform functions such as evaluating rules or accessing context objects based on rules, such configurations may not require any rules to be present in rule storage. For example, rule engine 215 may be configured to evaluate a rule including a context object reference even if no such rule is stored in rule storage 220. Thereafter, if a user adds such a rule to rule storage, rule engine 215 may process the rule as described herein. In other words, as used herein, the phrase "configured to" when used with respect to functionality related to rules will be understood to mean that the component is capable of performing the functionality as appropriate, regardless of whether a rule that requests such functionality is actually present.

User interface 225 may include hardware or executable instructions on a machine-readable storage medium configured to enable communication with a user. As such, user interface 225 may include a network interface (such as a network interface included in Diameter stack 205), a monitor, a keyboard, a mouse, or a touch-sensitive display. User interface 225 may also provide a graphical user interface (GUI) for facilitating user interaction. User interface 225 may enable a user to customize the behavior of DRA 200. For example, user interface 225 may enable a user to define rules for storage in rule storage 220 and evaluation by rule engine 215. Various additional methods for a user to customize the behavior of DRA 200 via user interface 225 will be apparent to those of skill in the art.

A customer may have a number of servers, each of which provides the same services and has the same Diameter identity. This configuration allows for ease in managing each of these servers as they have identical configurations. These servers may be isolated from each other so the duplicate identities are not a problem. It may be beneficial to apply policy control to these servers with a PCRF along with a DRA. However, when the DRA is deployed into this network, the DRA will be connected to all of these servers that have the same identity and will selectively route Diameter requests to each of these servers.

Figure 3:
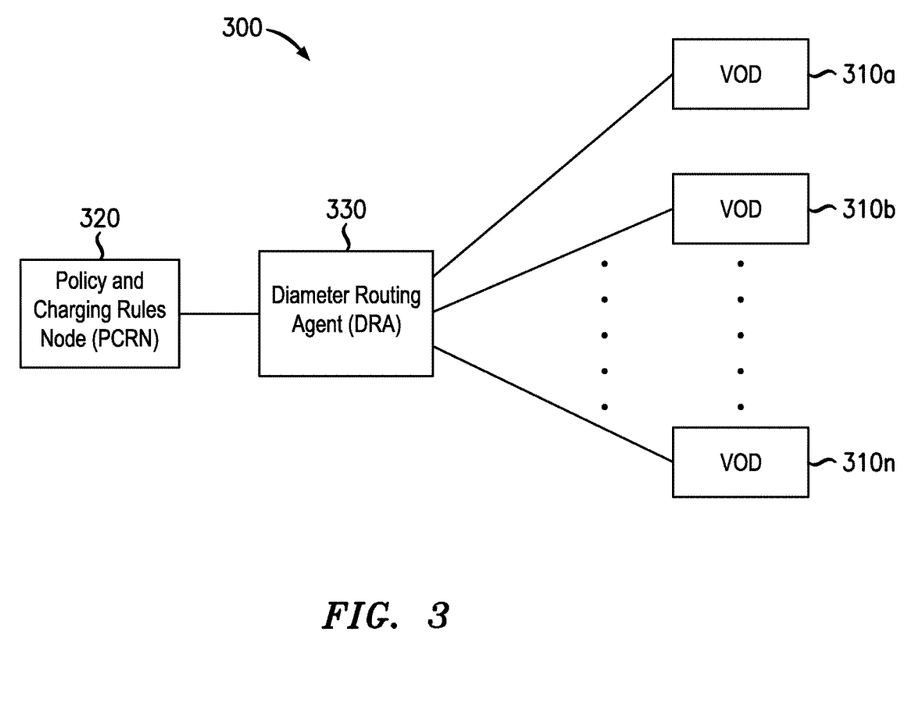
FIG. 3 illustrates a system providing video on demand that is managed by a PCRN.

FIG. 3 illustrates a system providing video on demand that is managed by a PCRN. The video on demand (VOD) system 300 may include a policy and charging rules node (PCRN) 320, a DRA 330, and a plurality of VOD servers 310*a-n*. As described above, the VOD servers 310*a-n* are each provided with identical configurations including the same Diameter ID. The PCRN 320 manages the VOD system 300 using Diameter messages. The DRA 330 facilitates the routing of Diameter messages from the PCRN 320 and other sources to the VOD servers 310*a-n*.

The Diameter RFC requires that each Diameter server have a unique identity, so the Diameter protocol as defined in RFC 3588 and later in RFC 6733 does not have a solution as to how to route traffic to a specific instance of one of the VOD servers 310*a-n* as they have the same Diameter IDs.

Below three different embodiments that provide solutions to this problem are described.

The DRA may be configured to specify it peers. The peer may be specified by a Diameter ID, IP address or DNS host-name, and port. The information for each of the peers may be stored in a peer table. A connection to a peer may be made based upon the Diameter ID of the device. The Diameter stack uses the peer table to keep track of all of its peers. If a Diameter message is received with a Diameter ID that is not found in the peer table, then a routing table may be used to determine if a route is identified that may be used to transmit the Diameter message. The route identifies the peer to which the Diameter message is to be sent.

Figure 4:
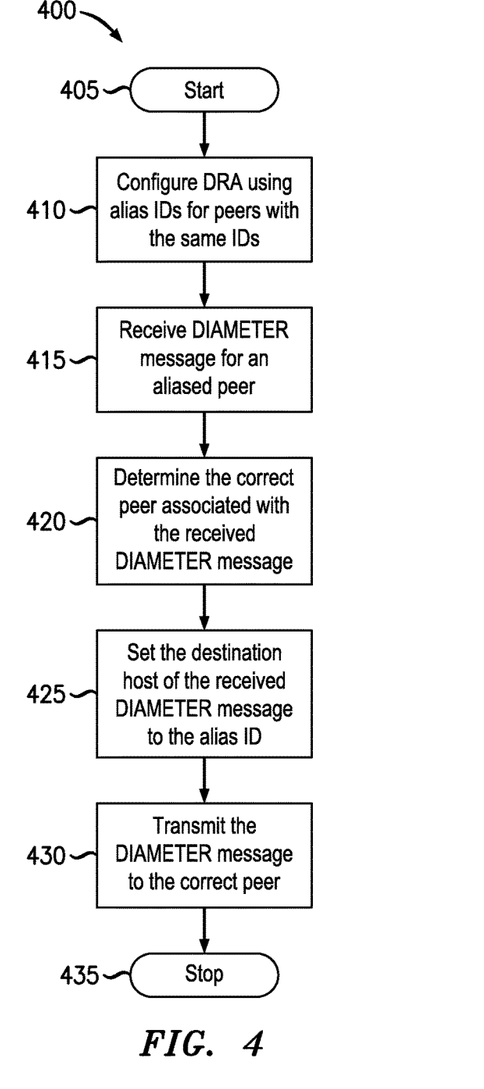
FIG. 4 illustrates a first embodiment of a method for routing Diameter messages in a system with multiple servers with identical Diameter IDs.

FIG. 4 illustrates a first embodiment of a method for routing Diameter messages in a system with multiple servers with identical Diameter IDs. The method 400 may be performed by the DRA 330 of FIG. 3. The method 400 begins at 405. The method 400 then configures the DRA 330 using alias Diameter IDs for each of the peer servers with the same Diameter IDs instead of the actual Diameter IDs 410. These peer servers with the same Diameter IDs may be, for example, the VOD servers 310*a-n*. For example, if the server identity was serverHost.serverRealm each instance would be given an alias such as serverHost1.serverRealm, serverHost2.serverRealm, etc. The DRA may scan the peer table and identify multiple servers with identical Diameter IDs. Then the aliases are assigned to these multiple servers with identical Diameter IDs. When peers with identical Diameters Ids are found, a record of these may be kept along with the alias and other pertinent information. Any type of data structure may be used to store lists of these peers. The pertinent information may include information from the peer that may be used to determine if a received Diameter message is associated with the peer. Alternatively, the pertinent information may be a pointer to information in the peer table that may be used to make such a determination.

The method 400 then proceeds receive a Diameter message to be routed to one of the aliased peer servers 415. Next, the method 400 determines the correct peer server associated with the received Diameter message 420. When routing Diameter messages to one of the peer servers, the DRA may use whatever criteria are appropriate to decide what peer server to route the request to. For example, rules may be used by the rules engine in the DRA to determine which peer server is associated with the Diameter message. These rules may determine the correct peer server based upon information related to the Diameter message, for example, where the request comes from, the IP address, destination realm, etc. Further, these rules may determine the correct peer server based upon information in the Diameter message, for example, a source host, source realm, application, information in a non-standard attribute-value pair, subscriber location, subscriber identification, destination realm, etc. These rules may compare information in the Diameter message with information found in the lists of peers with identical Diameter IDs. In another embodiment, the rules may compare information in the Diameter message with information in the peer table based upon the pointers in the list.

The method 400 may then set the Destination-Host of the Diameter message to the alias of the appropriate server, such as, for example, serverHost2.serverRealm 425. The Diameter message may then be transmitted to the correct peer server serverHost2.serverRealm 430. When forwarding the Diameter message, the DRA's Diameter stack sees that the Destination-Host of the request matches the identity of a peer server in its peer table and sends the request to that peer. Server.

An issue with this method is that the peer servers may receive a request for which the Destination-Host does not match their Diameter identity. According to the RFC, the peer server should not process this Diameter message. But many Diameter nodes will process Diameter messages that have the wrong Destination-Host, so for those nodes this approach will work.

Figure 5:
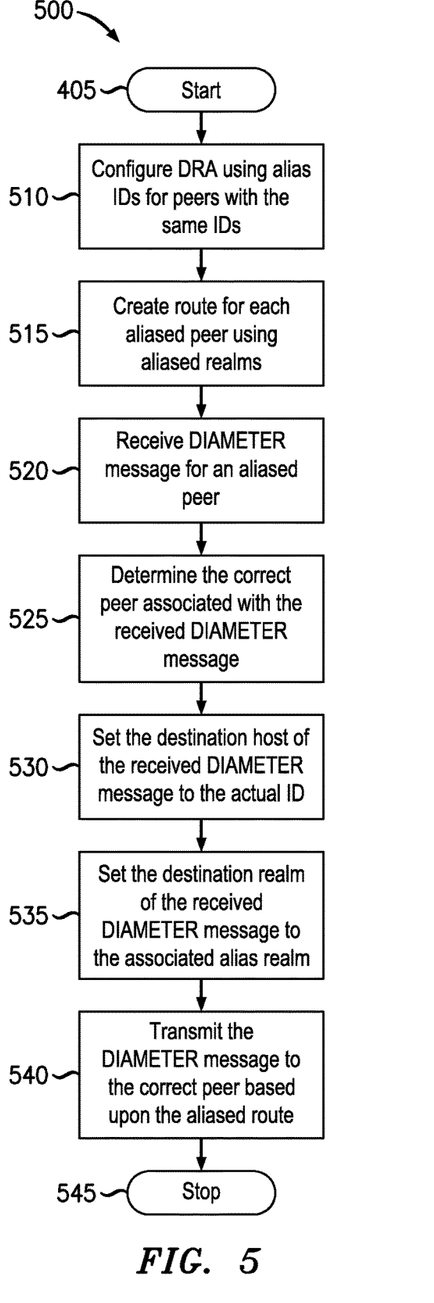
FIG. 5 illustrates a second embodiment of a method for routing Diameter messages in a system with multiple servers with identical Diameter IDs.

FIG. 5 illustrates a second embodiment of a method for routing Diameter messages in a system with multiple servers with identical Diameter IDs. The method 500 may be performed by the DRA 330 of FIG. 3. The method 500 begins at 505. The method 500 then configures the DRA 330 using alias Diameter IDs for each of the peer servers with the same Diameter IDs instead of the actual Diameter IDs. These peers with the same Diameter IDs may be, for example, the VOD servers 310a-n. For example, if the server identity was serverHost.serverRealm each instance may be given an alias such as serverHost1.serverRealm, serverHost2.serverRealm, etc. DRA may scan the peer table and identify multiple servers with identical Diameter IDs. Then the aliased Diameter IDs are assigned to these multiple servers with identical Diameter IDs.

Then the method 500 may create a route for each of the aliased peer servers using aliased realms 515. An aliased route is created for each server peer, where the aliased route includes a non-existent realm. A route is a triple of (Diameter application ID, peer ID, destination-realm). So, the aliased routes may be, for example, (<Gx application id>, serverHost1.serverRealm, nonExistentRealm1), (<Gx application id>, serverHost2.serverRealm, nonExistentRealm2), etc. Note that instead of the specific application id, a wildcard value could be used to indicate to route all applications using the route.

The method 500 then proceeds to receive a Diameter message to be routed to one of the aliased servers 520. Next, the method 500 determines the correct peer server associated with the received Diameter message 525. When routing Diameter messages to one of the peer servers, the DRA may use whatever criteria are appropriate to decide what peer server to route the request to. For example, rules may be used by the rules engine in the DRA to determine which peer server is associated with the Diameter message. These rules may determine the correct peer server based upon information related to the Diameter message, for example, where the request comes from, the IP address, destination realm, etc. Further, these rules may determine the correct peer server based upon information in the Diameter message, for example, a source host, source realm, application, information in a non-standard attribute-value pair, subscriber location, subscriber identification, destination realm, etc. These rules may compare information in the Diameter message with information found in the lists of peers with identical Diameter IDs. In another embodiment, the rules may compare information in the Diameter message with information in the peer table based upon the pointers in the list.

The method 500 may then set the Destination-Host of the Diameter message to the actual Destination-Host of the appropriate server 530. The method 500 may next set the destination realm of the Diameter message to the associated aliased realm of the appropriate peer server 535.

In an example of steps 530 and 535, the DRA may set the Destination-Host of the Diameter message to the true identity of the peer servers (serverHost.serverRealm), and would set the Destination-Realm of the Diameter message to one of the non-existent realms that corresponds to the appropriate peer server, for example, nonExistentRealm2.

The Diameter message may then be transmitted to the correct peer server based upon the aliased route 540. When trying to forward the Diameter message, the DRA's Diameter stack sees that the Destination-Host of the request does not match any peer so it then consults its route table. It sees that the Destination-Realm of the request matches one of the routes it has, so it forwards the request to the peer specified in the route, for example, serverHost2.serverRealm.

The method may then end at 545. It is noted that this embodiment is compliant with the Diameter standards. Further, a potential limitation of this approach is that the peer servers may receive a request for which the Destination-Realm does not match their realm. The RFC is silent on whether this matters. The RFC only states that if the Destination-Realm matches the local identity, the request should be processed.

Figure 6:
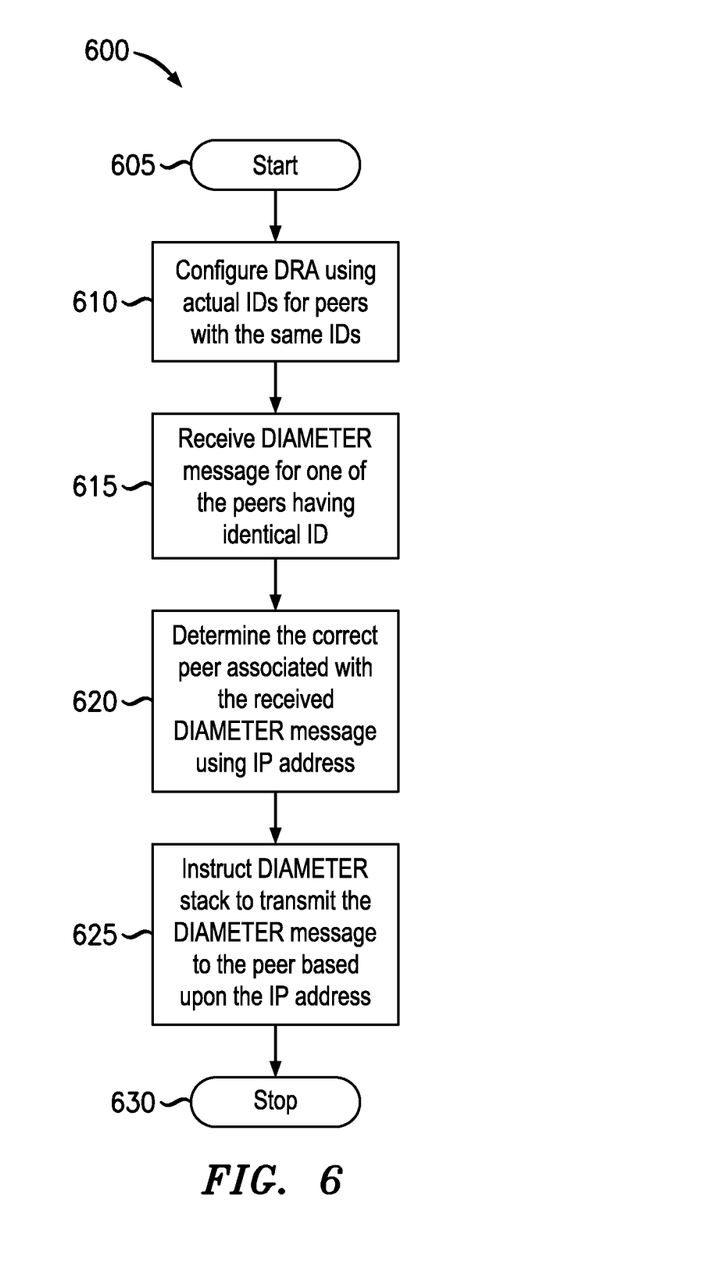
FIG. 6 illustrates a third embodiment of a method for routing Diameter messages in a system with multiple servers with identical Diameter IDs.

FIG. 6 illustrates a third embodiment of a method for routing Diameter messages in a system with multiple servers with identical Diameter IDs. The method 600 may be performed by the DRA 330 of FIG. 3. The method 600 begins at 605. The method 600 then configures the DRA 330 using the actual Diameter IDs for each of the peer servers with the same Diameter IDs. These peer servers with the same Diameter IDs may be, for example, the VOD servers 310a-n.

The method 600 then proceeds to receive a Diameter message to be routed to one of the peer servers having the same ID's 615. Next, the method 600 determines the correct peer server associated with the received Diameter message using the destination IP address in the received Diameter message 620.

For example, rules may be used by the rules engine in the DRA to determine which peer server is associated with the Diameter message. These rules may determine the correct peer server based upon information related to the Diameter message, for example, where the request comes from, the IP address, destination realm, etc. Further, these rules may determine the correct peer server based upon information in the Diameter message, for example, a source host, source realm, application, information in a non-standard attribute-value pair, subscriber location, subscriber identification, destination realm, etc. These rules may then determine the IP address of the correct peer server, because each of the peer servers with identical configurations including Diameter IDs has a unique IP address.

The DRA may then instruct the Diameter stack to transmit the Diameter message to the peer based upon the IP address 625. For example, the rules engine may search the peer table in the Diameter stack for a peer server that has that IP address. The rules engine may then instruct the Diameter stack to send the request to that peer server, overriding the normal RFC-based routing logic. For example, this may be done using a rule engine action such as Choose-Peer-By-IP-Address that takes an IP address as a parameter, does the peer table searching, and instructs the Diameter stack to send the request to the peer.

It is noted that aliasing as described above may be used in this embodiment or that the Diameter IDs may be left to be the same but with a unique IP addresses.

Is it also possible to instruct the Diameter stack to send the Diameter message to the peer server based upon the IP address by actually sending the actual peer object to the Diameter stack rather than having the Diameter stack go looking for the actual peer in the peer table. The Diameter stack would know to use the received peer object to route the message instead of looking in the peer table or routing table. This approach is not compliant with the logic specified in the RFC. But this approach provides a very powerful method of solving the problem of identical Diameter IDs for peer servers. It relies upon the IP address of the peer servers to differentiate the peer servers with otherwise identical configurations, as unique IP addresses are required in the network. Accordingly, the rules engine may bypass the normal routing logic of the Diameter stack to solve this problem.

In all three embodiments, when peers with identical Diameters Ids are found, a record of these may be kept. Any type of data structure may be used to store lists of these peers. Then when the DRA receives a Diameter message, the DRA may apply a rule that determines if the received Diameter messages is associated with any of the peers.

It should be apparent from the foregoing description that various exemplary embodiments of the invention may be implemented in hardware or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a Diameter Routing Agent (DRA) for processing a Diameter message, the method comprising:
providing a plurality of alias Diameter identifiers to a plurality of peer servers with identical Diameter identifiers;
creating a plurality of routes for each of the plurality of peer servers with the identical Diameter identifiers using a plurality of aliased realms;
receiving a Diameter message at the DRA associated with at least one of the plurality of peer servers having the identical Diameter identifiers;
determining a correct peer server among the plurality of peer servers having the identical Diameters identifiers associated with the received Diameter message;
setting a destination host of the received Diameter message to at least one of the plurality of the alias Diameter identifiers of the correct peer server;
setting a destination realm of the received Diameter message to at least one of the plurality of aliased realms associated with the correct peer server; and
transmitting the received Diameter message to the correct peer server.

2. The method of claim 1, wherein determining the correct peer server includes matching a destination IP address in the received Diameter message with an IP address of at least one of the plurality of peer servers with the identical Diameter identifiers.

3. The method of claim 1, wherein determining the correct peer server is based upon information in the received Diameter message, wherein the information in the received Diameter message is one of a source host, source realm, application, information in a non-standard attribute-value pair, subscriber location, subscriber identification, and destination realm.

4. The method of claim 3, wherein determining the correct peer server is based upon information related to the received Diameter message, wherein the information related to the received Diameter message is one of a IP address where the received Diameter message was received and an identity of the correct peer server from which the received Diameter message was received.

5. The method of claim 1, wherein providing the plurality of alias Diameter identifiers to the plurality of peer servers with the identical Diameter identifiers includes determining from a peer table that more than one peer server in the peer table has an identical Diameter identifier and providing at least one of the plurality of alias Diameter identifiers to the more than one peer server in the peer table.

6. A non-transitory machine-readable storage medium encoded with instructions for execution by a Diameter Routing Agent (DRA) for processing a Diameter message, the medium comprising:

instructions for providing a plurality of alias Diameter identifiers to a plurality of peer servers with identical Diameter identifiers;

instructions for creating a plurality of routes for each of the plurality of peer servers with the identical Diameter identifiers using a plurality of aliased realms;

instructions for receiving a Diameter message at the DRA associated with at least one of the plurality of peer servers having the identical Diameter identifiers;

instructions for determining a correct peer server among the plurality of peer servers having the identical Diameter identifiers associated with the received Diameter message;

instructions for setting a destination host of the received Diameter message to at least one of the plurality of alias Diameter identifiers of the correct peer server;

instructions for setting a destination realm of the received Diameter message to at least one of the plurality of the aliased realms associated with the correct peer server; and instructions for transmitting the received Diameter message to the correct peer server.

7. The non-transitory machine-readable storage medium of claim 6, wherein determining the correct peer server includes matching a destination IP address in the received Diameter message with an IP address of at least one of the plurality of peer servers with the identical Diameter identifiers.

8. The non-transitory machine-readable storage medium of claim 6, wherein determining the correct peer server is based upon information in the received Diameter message, wherein the information in the received Diameter message is one of a source host, source realm, application, information in a non-standard attribute-value pair, subscriber location, subscriber identification, and destination realm.

9. The non-transitory machine-readable storage medium of claim 8, wherein determining the correct peer server is based upon information related to the received Diameter message, wherein the information related to the received Diameter message is one of a IP address where the received Diameter message was received and an identity of the correct peer server from which the received Diameter message was received.

10. The non-transitory machine-readable storage medium of claim 6, wherein providing the plurality of alias Diameter identifiers (IDs) to the plurality of peer servers with the identical Diameter identifiers includes determining from a peer table that more than one peer server in the peer table has an identical Diameter identifier and providing at least one of the plurality of alias Diameter identifiers to the more than one peer server in the peer table.

* * * * *